March 24, 1953 — M. W. PHILLIPS — 2,632,287
APPARATUS FOR PRODUCING FIBROUS GLASS
Filed Feb. 10, 1950

INVENTOR.
Marion W. Phillips
BY Thos. E. Scofield
ATTORNEY.

Patented Mar. 24, 1953

2,632,287

UNITED STATES PATENT OFFICE 2,632,287

APPARATUS FOR PRODUCING FIBROUS GLASS

Marion W. Phillips, Kansas City, Kans., assignor to Gustin-Bacon Manufacturing Company, a corporation of Missouri Application February 10, 1950, Serial No. 143,387

7 Claims. (Cl. 49—17)

This invention relates in general to improvements in the production of glass filaments or fibers, and it deals more particularly with an improved apparatus for controlling the temperature conditions under which glass fibers are generated.

In the production of glass fibers it is a practice in the industry to bring the glass to a molten state in a furnace lined with an inert material capable of withstanding the high temperatures involved. Ordinarily the furnace liner or bushing, as it is frequently called, comprises a platinum vessel having orifices in its bottom through which the molten glass may issue and be drawn into thin filaments. Due to the intense heat required to melt the glass in the bushing, a temperature condition ordinarily is created below the orifice plate that makes proper attenuation of the fibers as they leave the orifices very difficult to achieve. Often, for example, the heat is of sufficient intensity to melt the fibers in two at a point a short distance below the orifice plate.

It is an object of the present invention broadly speaking, to eliminate, insofar as is possible, the undesirable temperature conditions below the furnace or bushing, to the end that breakage of the fibers as they are generated may be reduced to a minimum and uniformity of fiber size may be maintained consistently in commercial production.

A feature of the invention resides in the provision of baffles that control air circulation in the critical region in which fiber formation takes place. Another object of the invention is to draw the heat out of this critical region at a controlled rate and, to this end, an important feature lies in utilizing the aforementioned baffles as heat exchangers associated with a cooling system. More particularly, it is a feature to form the baffles with coils as a part thereof and circulate a cooling fluid through said coils at a controlled rate.

Other objects and features of novelty will appear in the course of the following description of the invention.

Figures 1, 2:
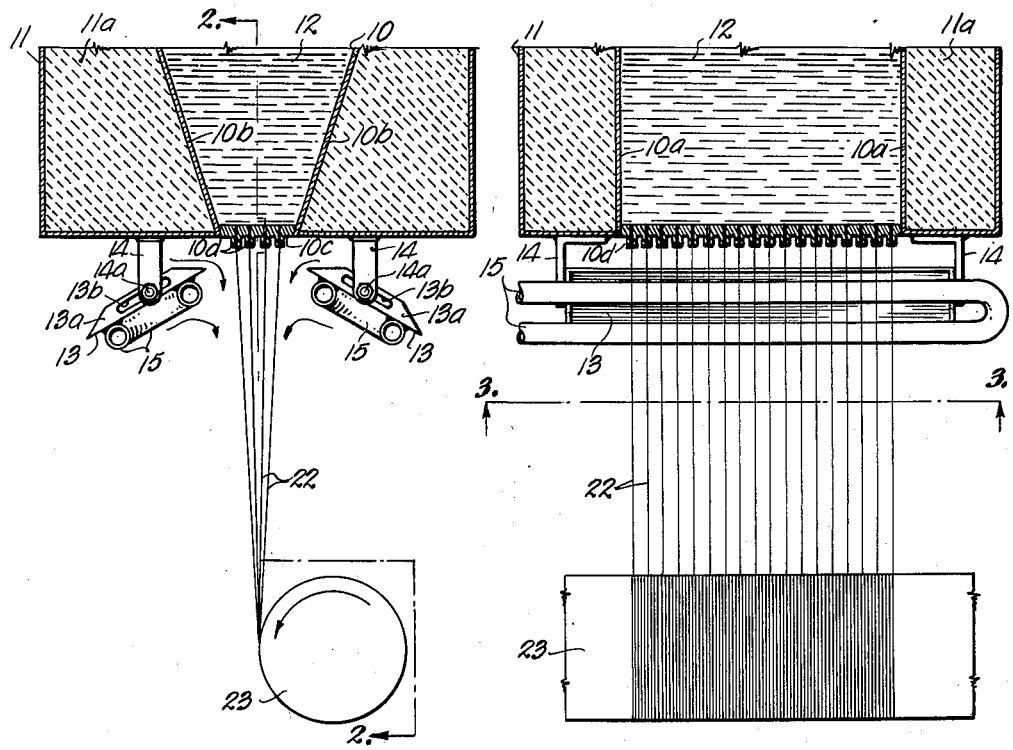
Figure 3:
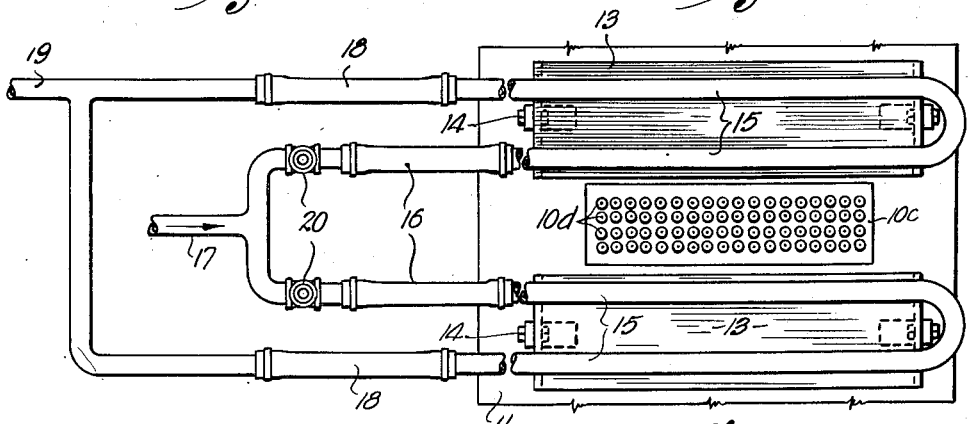
Figure 4:
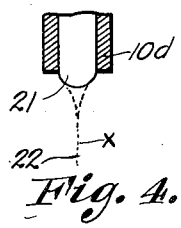

In the accompanying drawings which form a part of the specification and are to be read in conjunction therewith, and in which like reference numerals are employed to indicate like parts of the various views, Fig. 1 is a vertical cross sectional view of a fiber generating system embodying the invention, Fig. 2 is a cross sectional view taken along the line 2—2 of Fig. 1 in the direction of the arrows, Fig. 3 is a view taken along the line 3—3 of Fig. 2 in the direction of the arrows, and Fig. 4 is an enlarged cross sectional view of a single orifice showing the formation of a glass filament.

Referring more particularly to the drawings, the furnace liner or bushing comprises a trough-shaped unit 10 supported in an insulating housing 11, the trough having vertical end walls 10a, downwardly converging side walls 10b and a horizontal bottom 10c. In the bottom are a number of small orifices 10d arranged in longitudinal and lateral rows. Preferably, the bushing is constructed of platinum, which chemically is relatively inert to molten glass at the high temperatures involved and is adapted to withstand the intense heat necessary to melt the glass. The glass 12 in the bushing may be heated in any desired fashion, the preferred arrangement being one such as shown in my co-pending application Serial No. 107,095, filed July 27, 1949. The insulating material 11a surrounding the bushing serves to minimize loss of heat from the molten glass body.

Below the housing 11 are a pair of inclined baffle plates 13 disposed on either side of the bushing bottom 10c. The plates extend longitudinally of the bushing and each has at its opposite ends an upturned flange 13a containing an elongated slot 13b. They are supported by brackets 14 secured to and depending from the housing 11, bolts 14a being provided at the lower ends of the brackets to extend through the slots 13b. By this arrangement the baffle plates may be shifted toward or away from the orifices and may be pivoted to adjust the angle of their inclination. The preferred position of the baffles is as shown, i. e., converging upwardly with each inclined about 30° from horizontal and having its upper edge spaced below the bottom of the housing 11 and spaced laterally from the outermost row of orifices. The exact angle of inclination, however, is not critical.

To cool the baffle plates and control the temperature conditions in the region of the orifices, an essentially U-shaped tube 15 is welded to the face of each plate, the legs of the U in each case being parallel to, but set slightly inward from, the longitudinal margins of the baffle plate. One end of each tube is connected by a flexible hose 16 of rubber or other suitable material to valved coolant supply line 17, and other end is connected by a similar hose 18 to the discharge line 19. Thus, water or any other appropriate coolant may be pumped or otherwise circulated through the tubes at a rate controlled by valves 20.

Referring to Fig. 4, the molten glass in the bushing flows by gravity through each nipple or orifice 10d and forms a globule 21 as shown at the bottom of the orifice. Normally, due to the surface tension of the globule, the flow will not proceed further of its own accord. To produce a filament, it is customary for an operator to touch the globule with a glass rod or similar instrument which quickly fuses with the heated glass of the globule and then, by moving the rod downwardly, a thread of glass is drawn off as shown by dotted lines. This thread necks down and cools as it travels downwardly forming the desired filament 22, and, the filament severed from the rod is attached to a rotating cylindrical drum 23 (see Fig. 1) which continues the drawing of the filament and the winding thereof on the drum. It is a function of the orifice merely to continuously replenish the glass withdrawn and attenuated from the globule in the course of this operation.

Now, lacking the controlled cooling and air circulating arrangement I have provided, it often happens that the heat below the bushing is so intense that, as a filament is drawn down by drum 23 it cannot cool sufficiently to "set up" in filamentious form, but rather in the presence of this heat continues to neck down or attenuate at the point X or slightly therebelow to such fineness that it lacks strength to sustain the tension to which it is subjected and consequently breaks. The glass above the break then may tangle with one of the other filaments (perhaps breaking both) or it may retreat to the globule 21. In any event breakage is so prevalent that, starting with a relatively large group of orifices, the number of them functioning satisfactorily drops steadily and rather rapidly so that production from the bushing in inefficient.

Added to this difficulty is the fact that when one or more filaments have broken and the glass has retreated to the respective globules, the intense heat under the bushings sometimes renders the globule so fluid that its surface tension is insufficient to hold it in globular form; when this happens, the globule forms into a droplet which descends of its own accord, matting and fusing with adjacent filaments still being drawn, so that a flaw in all of them results.

My baffling and cooling arrangement overcomes these difficulties. The excess heat below the bushing is extracted at a controlled rate by the coolant circulating in the tubes 15, and a controlled circulation of the ambient air is induced by plates 13. As indicated by the arrows, this circulation of air appears to be upwardly along the upper and lower faces of the plate and then downwardly with the filaments which, by their own motion seem to draw the surrounding air downwardly due to frictional engagement therewith. In any event, due to the combined effect of the baffle plates and the cooling coils, the globules at the orifices neck down quickly to desired filament size, the filaments formed being of uniform diameter and having sufficient strength to sustain themselves so that there is almost no breakage or interruption in the continuity or operation.

From the foregoing it will be seen that this invention is one well adapted to attain all of the ends and objects hereinbefore set forth together with other advantages which are obvious and which are inherent to the arrangement.

It will be understood that certain features and sub-combinations are of utility and may be employed without reference to other features and sub-combinations. This is contemplated by and is within the scope of the claims.

Inasmuch as various modifications of the invention may be made without departing from the scope thereof, it should be understood that all matter herein set forth or shown in the accompanying drawings is to be interrupted as illustrative and not in a limiting sense.

Having thus described my invention, I claim:

1. In combination with a vessel having orifices in the bottom through which molten glass issues and is drawn into fine filaments, a pair of upwardly converging baffle plates disposed below and on either side of the orifices, the upper edge of each plate being spaced below and laterally of the orifices, and each baffle plate having secured thereto a conduit through which a coolant is adapted to flow.

2. A combination as in claim 1 wherein said conduit comprises a U-shaped tube affixed to the face of the baffle with the legs of the U extending along opposite edges of the baffle plate.

3. In combination with an insulated furnace containing a vessel having orifices in the bottom through which molten glass issues and is drawn into fine filaments, brackets projecting downwardly from the bottom of said furnace, and baffles pivotally mounted on said bracket beside the path of said filaments, each baffle containing a conduit through which a coolant is adapted to flow.

4. In combination with an insulated furnace containing a vessel having orifices in the bottom through which molten glass issues and is drawn into fine filaments, brackets projecting downwardly from the bottom of said furance, baffles pivotally mounted on said brackets beside the path of said filaments, each baffle having affixed to the face thereof a U-shaped tube through which coolant is adapted to flow, and the legs of the U being parallel to the pivotal axis of the baffle and disposed on opposite sides thereof.

5. In combination with an insulated furnace containing a vessel having orifices in the bottom through which molten glass issues and is drawn downwardly into fine filaments, stationary support means below said furnace, a pair of confronting baffles each disposed below the furnace on either side of said orifices, each baffle being pivotally mounted on said support means to turn about a horizontal axis parallel to the plane of the baffle whereby the angle of the baffle relative to the downwardly traveling filaments is adjustable, means for releasably securing the baffles in adjusted position, and means for artifically cooling each baffle, said last means comprising a flow passageway through which a coolant is circulated in heat exchange relation to the baffle.

6. In combination with an insulated furnace containing a vessel having orifices in the bottom through which molten glass issues and is drawn downwardly into fine filaments, stationary support means below said furnace, a pair of confronting baffles disposed below the furnace on either side of said orifices, each baffle being pivotally and slidably mounted on said support means to turn about a horizontal axis parallel to the plane of the baffle and shift in said plane along a path normal to said axis, whereby the angle and lateral spacing of each baffle relative to the downwardly traveling filaments is adjustable, means for releasably securing the baffles in adjusted position, and means for artificially cooling each baffle, said last means comprising a flow passageway through which a coolant is circulated in heat exchange relation to the baffle.

7. In combination with an insulated furnace containing a vessel having orifices in the bottom through which molten glass issues and is drawn downwardly into fine filaments, stationary support means below said furnace, a pair of upwardly converging baffles disposed below and on either side of said orifices, the upper edge of each baffle normally being spaced below and laterally of the orifices, each baffle being slidably mounted on said support means for movement in its own plane toward and away from said orifices thereby to adjust said spacing, means for releasably securing each baffle in adjusted position, and means for artificially cooling each baffle, said last means including a flow passageway through which a coolant is circulated in heat exchange relation to the baffle.

MARION W. PHILLIPS.

REFERENCES CITED

The following references are of record in the file of this patent:

UNITED STATES PATENTS

| Number | Name | Date |
| --- | --- | --- |
| 2,175,225 | Slayter | Oct. 10, 1939 |
| 2,387,557 | Modigliani | June 23, 1942 |
| 2,335,135 | Staelin | Nov. 23, 1943 |
| 2,418,873 | Fletcher et al. | Apr. 15, 1947 |
| 2,491,889 | Bennett et al. | Dec. 20, 1949 |